United States Patent [19]
Presz, Jr.

[11] Patent Number: 5,230,369
[45] Date of Patent: Jul. 27, 1993

[54] STRUCTURE TO REDUCE TURNING LOSSES IN ANGLED CONDUIT

[75] Inventor: Walter M. Presz, Jr., Wilbraham, Mass.

[73] Assignee: United Technologies Corporation, Hartford, Conn.

[21] Appl. No.: 847,838

[22] Filed: Mar. 9, 1992

Related U.S. Application Data

[63] Continuation of Ser. No. 632,685, Dec. 24, 1990, abandoned.

[51] Int. Cl.$^5$ ............................................. F15D 1/00
[52] U.S. Cl. .......................................... 138/39; 138/37
[58] Field of Search ...................... 138/37, 39; 244/130

[56] References Cited

U.S. PATENT DOCUMENTS

| | | | |
|---|---|---|---|
| 261,189 | 7/1882 | Walker | 138/92 |
| 288,550 | 11/1883 | Coombes | 138/37 |
| 571,612 | 11/1896 | Eichhorn | 138/37 |
| 1,467,168 | 9/1923 | Kaplan | 138/37 |
| 1,582,369 | 4/1926 | Aske | 138/37 |
| 2,705,973 | 4/1955 | Kice | 138/39 |
| 3,487,574 | 1/1970 | Lööf | 138/104 |
| 4,015,954 | 4/1977 | Reed | 138/37 |
| 4,302,935 | 12/1981 | Cousimano | 138/39 |

FOREIGN PATENT DOCUMENTS

| | | | |
|---|---|---|---|
| 156269 | 10/1985 | European Pat. Off. | 138/37 |
| 321379 | 6/1989 | European Pat. Off. | |
| 192795 | 1/1908 | Fed. Rep. of Germany | 138/39 |
| 259758 | 8/1928 | Italy | 138/39 |
| 700615 | 12/1953 | United Kingdom | |
| 228823 | 4/1971 | United Kingdom | |

Primary Examiner—James E. Bryant, III

[57] ABSTRACT

Downstream extending convolutions (52) disposed on the inside corner (72) of an angled conduit (50) eliminate or reduce the two-dimensional boundary layer separation region (44) thereby eliminating or reducing the pressure losses associated with the separation region (44). The convolutions (52) may be formed into either the angled conduit wall or in an insert (200) which is positioned on the inside corner surface of the conduit.

7 Claims, 5 Drawing Sheets

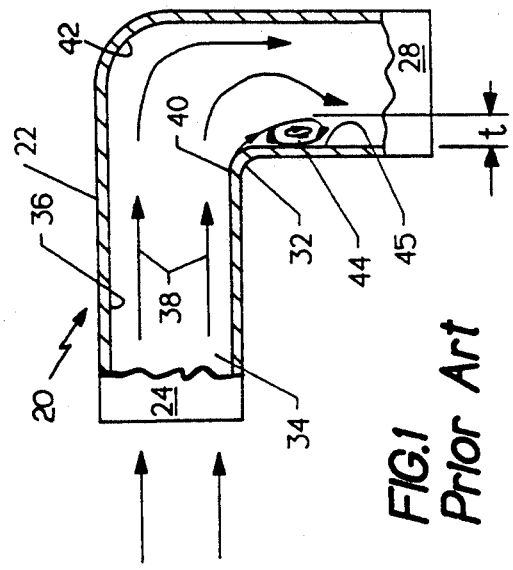
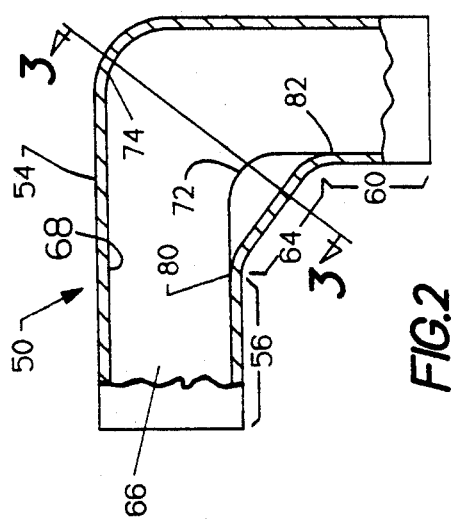
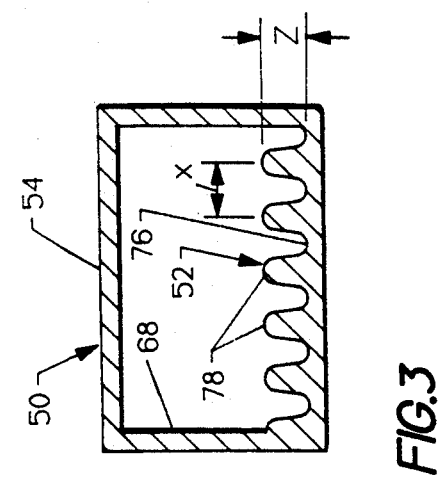
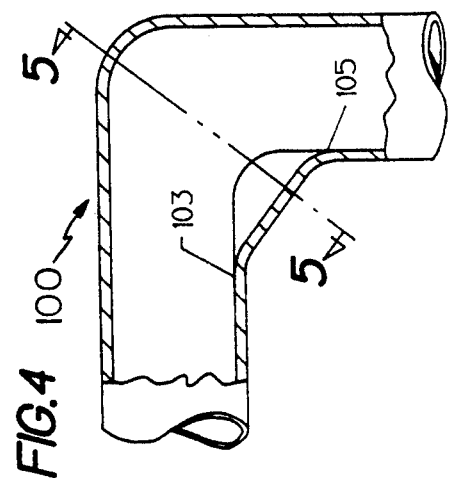
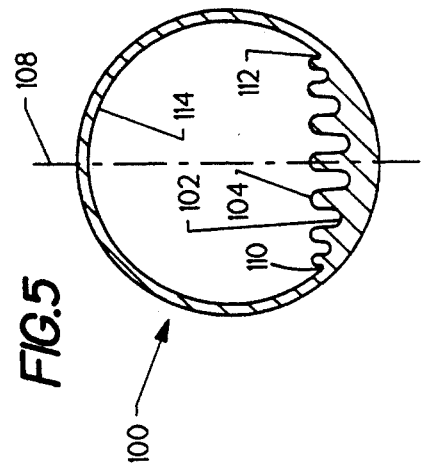

STRUCTURE TO REDUCE TURNING LOSSES IN ANGLED CONDUIT

This application is a continuation of application Ser. No. 07/632,685 filed Dec. 24, 1990, now abandoned.

TECHNICAL FIELD

This invention relates to flow in conduits.

BACKGROUND ART

A major problem with flowing a fluid through a conduit, such as a duct or pipe, is the pressure losses which accumulate over the distance travelled by the fluid. A principal source of the losses is two-dimensional boundary layer separation which occurs immediately downstream of sharp turns in the conduit.

Separation is a result of the lack of momentum in the boundary layer of the flow in the new direction dictated by the turn in the conduit. This causes the boundary layer along the surface of the inside corner to the conduit to detach from the surface immediately downstream of the turn. The fluid adjacent to the conduit surface in the separation region flows in the reverse direction, due to the inability of the momentum of the flow to overcome the back pressure in the flow, and interaction with the flow of the bulk fluid produces an eddy which recirculates the fluid. The recirculation removes energy from the flow and results in a pressure loss proportional to the size of the separation region.

Another problem associated with the separation region is the pressure pulses generated in the flow as the re-attachment point of the bulk fluid fluctuates in position. The re-attachment position is the downstream point where the separation region ends and the flow of the bulk fluid contacts the surface again. The position of the re-attachment point fluctuates as the size of the separation region various and larger separation regions produce larger pressure pulses. The generation of the pressure pulses increase the instability of the flow and can damage, or increase the noise level associated with, components actuated by the flow.

One method to overcome the loss in fluid pressure is to increase the pressure of the fluid at the inlet of the conduit by an amount equal to the accumulated pressure losses. This solution is undesirable due to the added cost of producing a higher inlet pressure and of fabricating a conduit around the increased pressure requirements. Additionally, this solution would generate larger separation regions and larger pressure pulses. Another solution is to route the flow such that turns are kept to a minimum. Although a conduit without any turns would be ideal, for many purposes a straight conduit is impractical. It is, therefore, highly desirable to conduct a flow of fluid through an angled conduit with minimal pressure losses.

DISCLOSURE OF INVENTION

An object of the invention is to eliminate or decrease the extent of the separation region on the inside corner wall of a bend in a conduit and to thereby reduce pressure losses in the flow.

Another object is to eliminate or reduce pressure pulses in the flow.

According to the present invention, a convoluted surface on the inside corner of conduit bend provides a means to reduce or eliminate the separation region associated with flow around the corner. The convoluted surface, which is configured to generate large scale vortices, produces a flow variation which disrupts the eddy flow in the separation region, thereby reducing turning losses. The size and shape of the convolutions are selected to delay separations of the fluid from the surface of the convolutions, preferably around the entire corner, but certainly further downstream as would otherwise occur.

"Large scale" vortices as used herein means vortices with dimensional characteristics of the same order of magnitude as the maximum height of the convolutions.

More particularly, a conduit for a fluid flow has a bend or corner portion, with a convoluted surface located at the inner corner of the corner portion. The convoluted surface consists of a plurality of downstream extending, adjoining, alternating troughs and ridges which preferably blend smoothly with each other along their length to form a smooth undulating surface.

It is believed that the troughs and ridges eliminate or reduce the extent of the separation region downstream of the corner by producing a flow variation which disrupts the eddy flow in the separation region and allows the boundary layer to re-attach sooner, and by delaying separation as the fluid flows around the corner. The flow variation is the result of the lateral momentum picked up by the fluid which flows through the troughs and which generates a spiralling motion in the fluid. It is this spiralling motion about an axis normal to the axis of the eddy flow which disrupts the recirculation in the separation region. By reducing the size of the separation region the pressure losses associated with the flow travelling around a corner are reduced. In addition, the reduction in size of the separation region improves the stability of the flow and reduces the magnitude of the pressure pulses generated by the separation region.

The foregoing and other objects, features and advantages of the present invention will become more apparent in the light of the following detailed description of preferred embodiments thereof as illustrated in the accompanying drawings.

BRIEF DESCRIPTION OF THE DRAWINGS

FIG. 1 is side view of a flow conduit having a corner in accordance with prior art.

FIG. 2 is a side view of a flow conduit of rectangular cross-section with a convoluted surface on the inner corner surface in accordance with the present invention.

FIG. 3 is a sectional view taken along line 3-3 of FIG. 2.

FIG. 4 is a side view of a flow conduit of circular cross-section with a convoluted surface on the inner corner surface.

FIG. 5 is a sectional view taken along line 5—5 of FIG. 4.

BEST MODE FOR CARRYING OUT THE INVENTION

Figure 6:
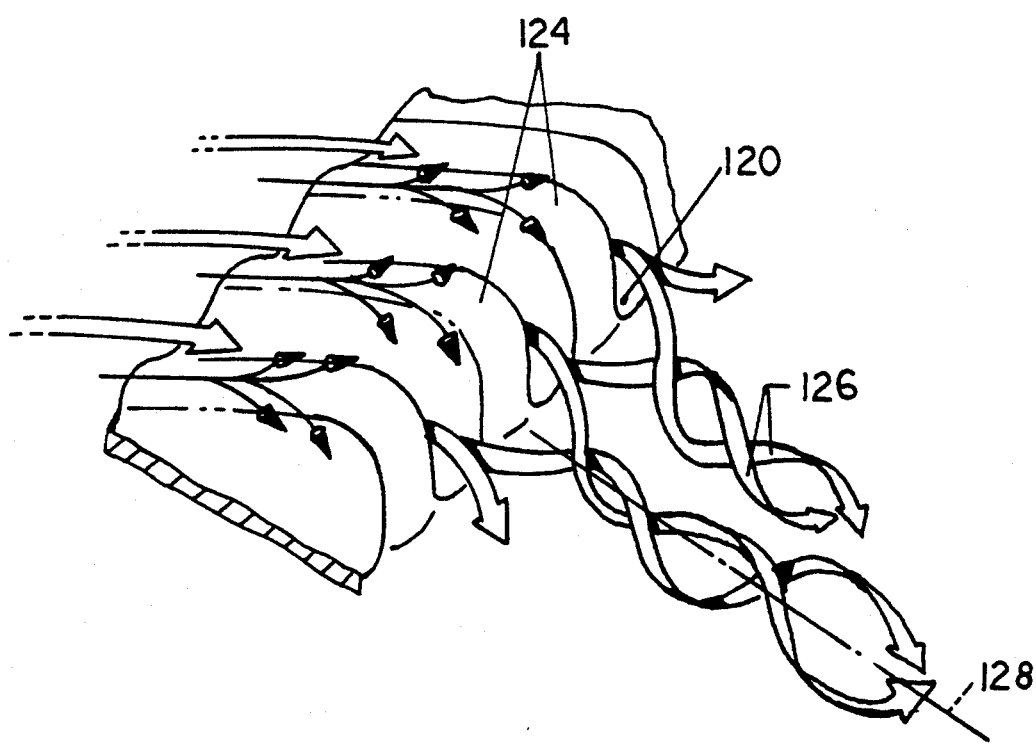
FIG. 6 is an illustration of the vortices generated by flow over a convoluted surface.

Referring now to FIG. 1, a conduit 20 in accordance with prior art comprises a wall 22 defining an upstream conduit portion 24, a downstream conduit portion 28, and a corner portion 32 joining the upstream conduit portion 24 and downstream conduit portion 28. The internal surface 36 of the wall 22 defines a fluid passage 34 with the fluid flow direction indicated by arrows 38. The internal surface 36 includes an inner corner surface 40 and an outer corner surface 42. Inner corner surface, as defined and used hereafter, is the portion of the internal surface of the corner portion disposed nearest to the center of turning radius of the flow through the corner portion. Outer corner surface is the portion of the internal surface of the corner portion disposed furthest from the center of turning radius of the flow through the corner portion.

The change in direction of the flow within the corner portion generates a two-dimensional boundary layer separation region 44 which extends to a re-attachment point 45 located on the surface 36. Separation occurs when the momentum in the boundary layer along the inner corner surface 40 cannot overcome the back pressure as the fluid travels downstream. At this point the flow velocity reverses direction, relative to the velocity of the adjacent bulk fluid, and the boundary layer breaks loose, or separates, from the inner corner surface 40. Separation results in a recirculation of the fluid about an axis perpendicular to the downstream direction of the flow. The recirculation removes energy from the fluid flow and produces pressure losses in the flow proportional to the size of the separation region 44.

Referring now to FIGS. 2 and 3, a rectangular conduit 50 similar to the conduit 20 of FIG. 1 is shown, but it incorporates the teaching of the present invention. The conduit comprises a wall 54 defining an upstream conduit portion 56, a downstream conduit portion 60, and a corner portion 64 joining the upstream conduit portion 56 and downstream conduit portion 60. The internal surface 68 of the wall 54 defines a fluid passage 66. The internal surface includes an inner corner surface 72, an outer corner surface 74. In accordance with the present invention, the inner corner surface 72 includes a plurality of convolutions 52 (FIG. 3).

The convolutions 52 are a series of downstream extending, alternating, adjoining troughs 76 and ridges 78. The troughs 76 and ridges 78, in this exemplary embodiment, are basically U-shaped in cross-section, as shown in FIG. 3, and blend smoothly along their length to form the undulating corner surface 72 extending from the entrance to the exit of the corner. In this embodiment the height of the ridges 78 increases gradually from the upstream end 80 to a maximum and then decreases gradually to zero at the downstream end 82.

A circular conduit 100 which incorporates the troughs 102 and ridges 104 (ie: convolutions) of the present invention is shown in FIGS. 4 and 5. The ridges 104 gradually increase in height from the upstream end 103 to a maximum and then decrease to zero at the downstream end 105. One difference between this embodiment and the embodiment of FIGS. 2 and 3 is the decreasing height of the ridges 104 from a maximum at the central flow plane 108 to a minimum at the sides 110,112 of the conduit 100. This difference takes into account the curvature of the inner surface 114 as well as the expected reduced separation region thickness as one moves away from the central flow plane 108 toward the left and right sides 110,112 of the conduit 100.

The troughs and ridges are believed to reduce or eliminate the separation region by producing a flow variation which disrupts the eddy current and allows the boundary layer to re-attach to the inside wall further upstream than would otherwise occur. As shown in FIG. 6, fluid flowing through the troughs 120 and over the ridges 124 acquires lateral momentum as it exits the troughs due to the low pressure region existing immediately downstream of the ridge 124. The result is the generation of adjacent pairs of counterrotating vortices 126, initially about an axis 128 parallel to the bottom surface of the troughs.

As shown in this illustration, the ridges 124 increase in height to essentially their downstream end and then decrease in height rather abruptly.

Figure 7:
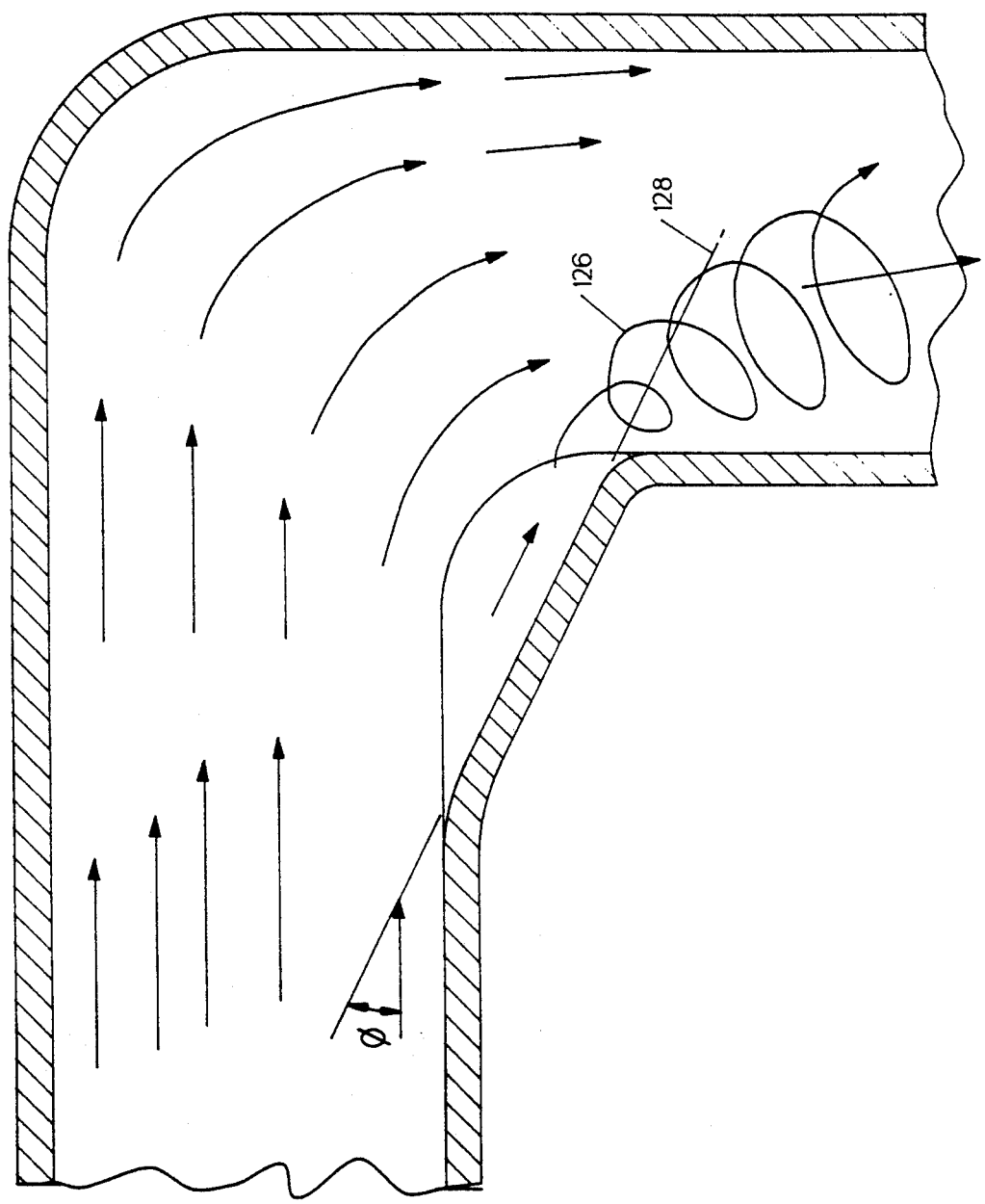
FIG. 7 is an illustration of the vortices generated by the convoluted surface.

As shown in FIG. 7, the spiralling flow, aided by the movement of the bulk fluid flow, is directed into the region where separation would normally occur, thereby disrupting the build-up of a large scale eddy.

Reducing the size of the separation region reduces the pressure losses associated with the turn in a conduit. The reduction in size of the separation region also improves the stability of the flow and reduces the magnitude of pressure pulses generated.

To have the desired effect of eliminating or significantly reducing the extent of the separation region, it is believed that certain parametric relationships should be met. These parametric relationships are based on empirical data, known flow theory, and hypothesis concerning the phenomenon involved. First, the maximum height of the ridges (peak to peak wave amplitude Z, see FIG. 3) should be of the same order of magnitude as the thickness ("t" in FIG. 1) of the separation region expected to occur immediately downstream of the inner corner if the convolutions were not present.

Second, it is believed that the angle $\phi$ between the bottom surface of the troughs (which is here shown as being straight over a substantial portion of the corner) and the direction of flow upstream of the corner (see FIG. 7) is best between 20 degrees and 45 degrees, with approximately 30 degrees being preferable. If the angle $\phi$ is too small, the vorticity generated is insufficient. If the angle $\phi$ is too large, flow separation will occur in the troughs.

Third, it is believed that the aspect ratio, which is defined as the ratio of the distance between adjacent ridges (wavelength X, see FIG. 3) to the maximum height of the ridges (peak to peak wave amplitude Z, see FIG. 3), is preferably no greater than 4.0 and no less than 0.2.

Finally, it is believed to be desirable to have as large a portion of the opposed sidewalls of each trough parallel to each other or closely parallel to each other in the direction in which the wave amplitude Z is measured.

A further discussion on the preferred size and shape of troughs and ridges useful in the application of the present invention is found in commonly owned U.S. Pat. No. 4,789,117, which is incorporated herein by reference.

Figure 9:
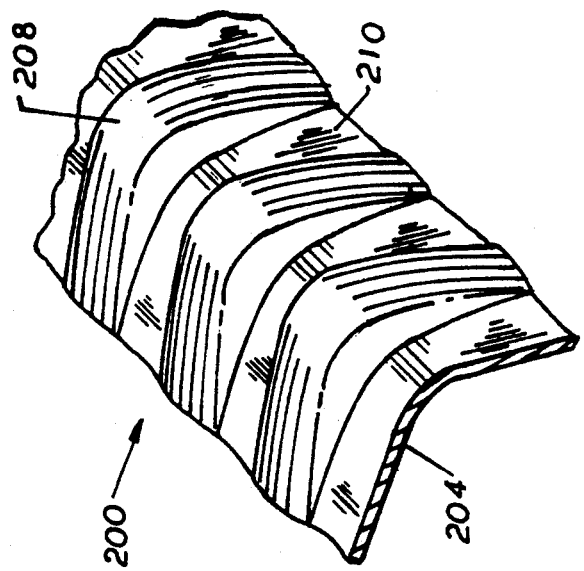
FIG. 9 is a perspective view of the convoluted flow insert of FIG. 8.
Figure 10:
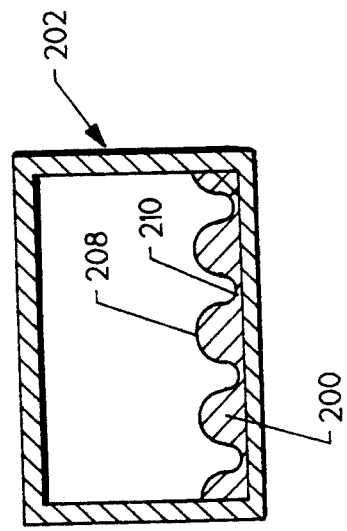
FIG. 10 is a sectional view taken along line 10—10 of FIG. 8.
Figure 8:
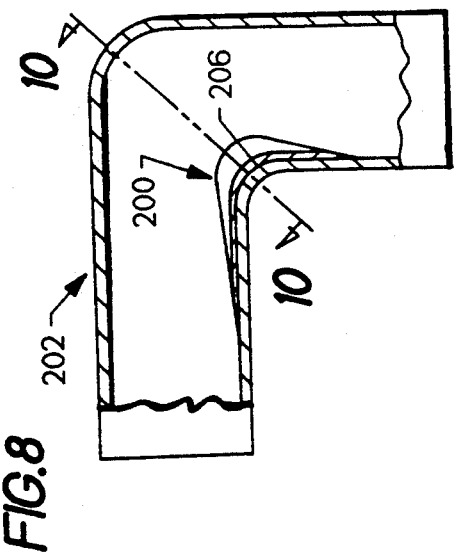
FIG. 8 is a side view of a flow conduit with a convoluted flow insert.
Figure 11:
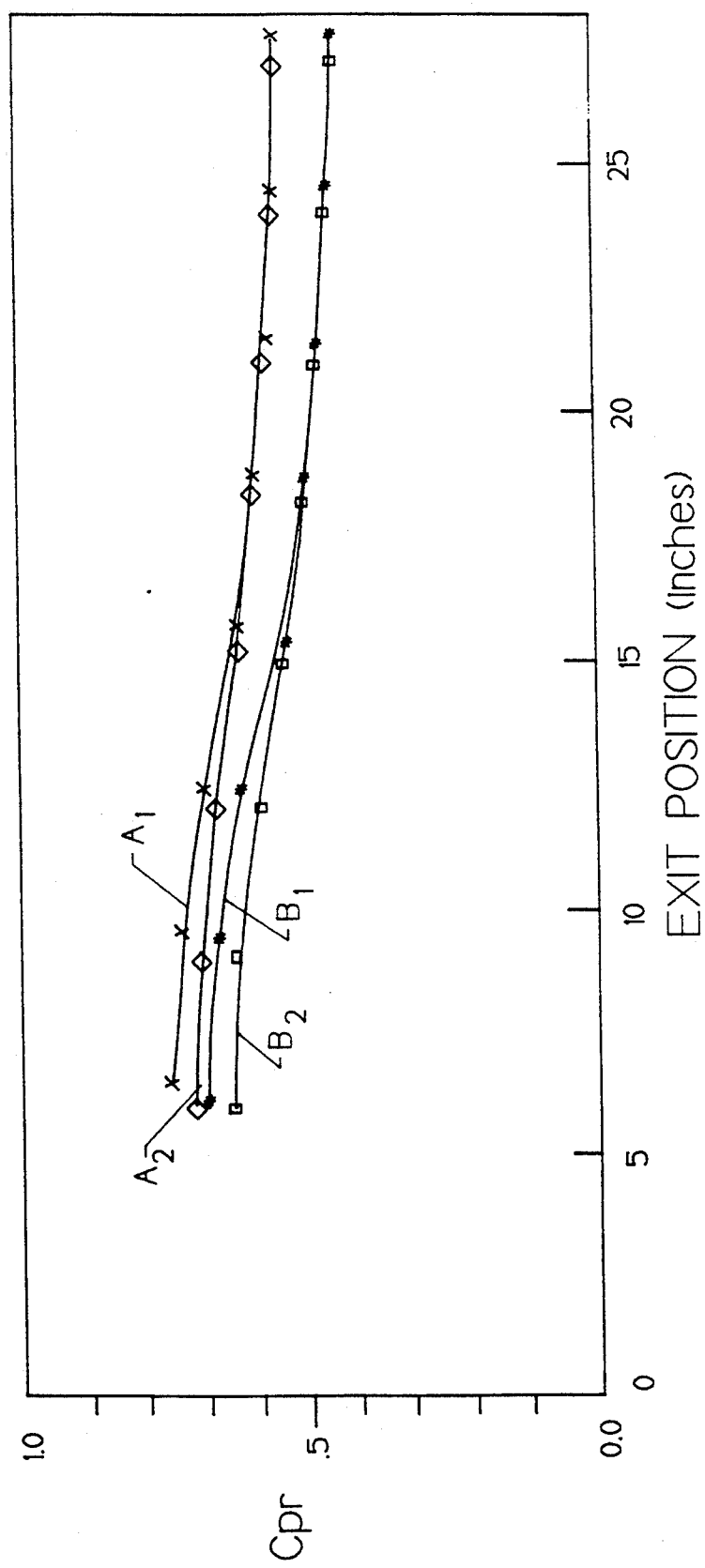
FIG. 11 is a graph of pressure rise coefficient as a function of downstream position for a conduit with and without a convoluted surface on the inside corner of the inner wall.

As shown in FIGS. 8 to 10, troughs and ridges may be incorporated into the inside corners of turns in conduits by means of a convoluted insert. The convoluted insert 200 is comprised of a base 204 which is shaped to conform to the inner corner 206 of the conduit 202. The base 204 includes a plurality of alternating ridges 208 and troughs 210, similar to the ridges and troughs of previous embodiments. The same trough and ridge parametric relationships which were discussed previously for the embodiments shown in FIG. 2 to 4 are applicable to the embodiment of FIGS. 8 to 10, except the bottoms of the troughs have a continuous curvature and the angle $\phi$ is therefore variable.

Tests were performed to evaluate the effectiveness of a convoluted surface in reducing pressure losses in the corners of conduits. The tests were performed using air as the fluid and a test rig which consisted of a duct of rectangular cross-section (width=21.25 inches, height=5.4 inches), and either a right angle turn without convolutions on the inside corner (similar to FIG. 1) or a right angle turn with convolutions on the inside corner (similar to that shown in FIGS. 2 and 3). The convolutions had a maximum height Z of 0.75 inches and a wavelength X of 1.10 inches, which results in a height to wavelength ratio of 0.68. Apparatus was tested wherein the angle $\phi$ between the bottom surface of the troughs and the flow direction upstream of the corner was at 20 degrees, 30 degrees, and 45 degrees, respectively. Upstream static wall pressure and the fluid flow dynamic pressure were measured at a point sufficiently far upstream of the corner to eliminate the possibility of any effects of the turn on these measurements. Static wall pressure was also measured at several points downstream of the turn in order to be able to determine pressure loss, due to a turn, as a function of downstream position. In addition, measurements of downstream static wall pressure were taken along the inner wall and the outer wall (inner and outer relative to the radius of the turn).

The results of the test with $\phi=30$ degrees are shown graphically in FIG. 8, which is a plot of pressure rise coefficient ($C_{pr}$) as a function of downstream location for points on both the inner corner and outer corner wall. The curves $A_1$ and $A_2$ are for a conduit without the convolutions of the present invention. $A_1$ represents outer corner wall points and $A_2$ represents inner corner wall points. $B_1$ and $B_2$ are for a conduit with convolutions on the inner corner. $B_1$ represents points on the outer corner wall and $B_2$ represents points on the inner corner wall. $C_{pr}$ is calculated by subtracting the downstream wall pressure at a particular point from the upstream wall pressure and dividing by the dynamic pressure. Larger pressure losses, therefore, produce larger values of $C_{pr}$. The results confirm that the corner with convolutions produced lower pressure losses than the corner without convolutions and, for the embodiment used in this test, there was a 15% to 20% decrease in pressure loss.

The embodiments illustrated in FIGS. 2 through 10 shows the invention used in conduits with right angle turns. The invention should reduce pressure losses in conduits with turns of any angle which produce two-dimensional boundary layer separation. In addition, even though the embodiments illustrated were incorporated in conduits with rectangular and circular cross-sections, the invention is equally applicable to conduits of other cross-sectional shapes.

Although the invention has been shown and described with respect to exemplary embodiments thereof, it should be understood by those skilled in the art that various changes, omissions and additions may be made therein and thereto, without departing from the spirit and the scope of the invention.

I claim:

1. A duct for carrying a fluid in a downstream direction, said duct having an internal surface defining an internal flow passage including a corner portion for turning the flow, said corner portion having an upstream end and a downstream end, said internal surface of said corner portion defining an inner corner surface of said flow passage, said inner corner surface including means to generate large scale vortices and produce a flow variation which disrupts the eddy flow in the separation region to reduce turning losses, said means comprising a plurality of downstream extending, adjoining alternating troughs and ridges, wherein said troughs and ridges extend from said upstream end of said corner portion to said downstream end of said corner portion, forming convolutions in said inner corner surface, said troughs and ridges increasing in depth and height, respectively, from said upstream end to a maximum depth and height and decreasing from said maximum depth and height to zero depth and height at said downstream end.

2. The duct according to claim 1, wherein said troughs and ridges are U-shaped in cross section taken perpendicular to their length and blend smoothly with each other along their length to form a smoothly undulating surface.

3. The duct according to claim 1, wherein said duct is circular in cross-section.

4. The duct according to claim 1, wherein said duct is rectangular in cross-section.

5. The duct according to claim 1, wherein each of said troughs and ridges has a wavelength X, defined as the distance between adjacent ridges, a maximum height Z, and an aspect ratio, defined as the ratio X/Z, greater than or equal to 0.2 and less than or equal to 4.0.

6. The duct according to claim 1, wherein each of said troughs has a bottom surface portion extending in a straight line, wherein the angle between said bottom surface portion and the direction of flow immediately upstream of said corner portion is greater than 20 degrees and less than 45 degrees.

7. The duct according to claim 2, wherein each of said troughs have opposed sidewalls which are substantially parallel to each other.

* * * * *